(12) United States Patent
Merkushev et al.

(10) Patent No.: US 11,869,019 B2
(45) Date of Patent: Jan. 9, 2024

(54) SYSTEM FOR PROTECTION AGAINST COUNTERFEITING AND FORGERY

(71) Applicant: INTEGRITI, LLC, Perm (RU)

(72) Inventors: Mihail A. Merkushev, Perm (RU); Denis A. Kurashov, Perm (RU); Kirill V. Samodelkin, Perm (RU); Andrej V. Drozhzhachih, Perm (RU); Ivan I. Zhuravlev, Volgograd (RU); Yevgeniy N. Ivanov, Volgograd (RU)

( * ) Notice: Subject to any disclaimer, the term of this patent is extended or adjusted under 35 U.S.C. 154(b) by 0 days.

(21) Appl. No.: 17/909,673

(22) PCT Filed: Jun. 4, 2021

(86) PCT No.: PCT/RU2021/050155
§ 371 (c)(1),
(2) Date: Sep. 6, 2022

(87) PCT Pub. No.: WO2021/251849
PCT Pub. Date: Dec. 16, 2021

(65) Prior Publication Data
US 2023/0107074 A1  Apr. 6, 2023

(30) Foreign Application Priority Data
Jun. 8, 2020 (RU) .......................... RU2020119616

(51) Int. Cl.
*G06Q 30/00* (2023.01)
*G06Q 30/018* (2023.01)
*G06K 19/10* (2006.01)

(52) U.S. Cl.
CPC ......... *G06Q 30/0185* (2013.01); *G06K 19/10* (2013.01)

(58) Field of Classification Search
CPC .......................... G06Q 30/0185; G06K 19/10
USPC ....................................................... 235/375
See application file for complete search history.

(56) References Cited

U.S. PATENT DOCUMENTS

| 2008/0044649 | A1* | 2/2008 | Fujimoto | G09F 3/10 |
| | | | | 428/345 |
| 2010/0071609 | A1* | 3/2010 | Rosset | D21H 21/42 |
| | | | | 162/138 |
| 2021/0248338 | A1* | 8/2021 | Spivack | G06K 7/10831 |

OTHER PUBLICATIONS

International Search Report in corresponding International Application No. PCT/RU2021/050155.

* cited by examiner

*Primary Examiner* — Daniel A Hess
(74) *Attorney, Agent, or Firm* — Lawrence G. Fridman, Esq.; FEIGIN & FRIDMAN, LLC

(57) ABSTRACT

The essence of the invention consists in recognition technique using means for telecommunication that are equipped with a unique program for recognizing identification codes located inside lengthy products. An identification code contains information about the manufacturer, as well as information about physical characteristics of the product as described in the certificate of quality.

5 Claims, 2 Drawing Sheets

SYSTEM FOR PROTECTION AGAINST COUNTERFEITING AND FORGERY

FIELD AND BRIEF SUMMARY OF THE INVENTION

The invention relates to the technology of recognizing/identifying, through the use of telecommunication means equipped with a unique identification program, of identification codes located inside the lengthy products. The identification code contains information about the manufacturer, as well as the physical characteristics of the goods reflected in a quality certificate.

The spaced from each other identification codes are printed on a special flexible tape (which can be made of Dacron) by chemical ink. In the manufacturing process the codes can placed linearly or spirally along the entire length of the lengthy product, thereby providing a high level of internal protection against counterfeiting and forgery.

The encoded information is read from the tape placed inside the product using telecommunication devices by means of a special program, also developed by the inventors of the present patent application. It should be noted that access to this program is open through Google Play Mark and Apple Store for any user interested in obtaining information about the authenticity of the lengthy products, about their length, or their technical characteristics reflected in the product quality certificates as well as additional information placed by the manufacturer at his discretion.

The spectrum of use of the invention is very broad due to the internal placement of the identification codes and their recognition by means of a special program downloaded into the telecommunication device via Google Play Market and Apple Store.

It should be expressly noted that the invention relates to techniques for determining the authenticity of products produced legally. The technical effect of the present invention is to provide a technology for multi-level protection against counterfeiting and forgery of products by encoding, internal placement of the tape with identification codes and their recognition by means of a special program in telecommunication means by any interested person. Specifically, the presented technology provides a high degree of reliability, availability and high level of information content.

A based on the technology of the invention, the products are encoded by placement of a special tape having applied identification codes at regular intervals throughout its length.

Thus, IT company ((Integrity)) develops a system of identification codes and generates them in its own database. The IT Company provides of the Dacron tape with the corresponding identification codes applied by the chemical ink.

The company also maintains a post-release control of the quality and readability of the identification codes applied along the entire length of the tape.

After purchasing the tape with identification codes, the tape is placed inside the lengthy product linearly or helically along the entire product's length. At its own discretion, the following information is transmitted by the manufacturer to the IT company: the data about the "beginning" and "end" of the segment, information in accordance with the certificate of category of the product, as well as additional information about the manufacturing company. This is needed to supplement the data of its own information base.

A consumer, which may be any person interested in verifying the authenticity of the purchased product, acquires a unique program related to its own telecommunication device through Google Play Mark and Apple Store. This program recognizes unique codes located inside the lengthy product. The scanning the codes makes it possible to obtain information about the authenticity of the product, the length, physical characteristics of the product, and also additional information provided by the manufacturer.

Within the system of the invention, a consumer is considered to be any person desiring to obtain information about the authenticity of the goods to be purchased. The invention is directed to providing a user with protection against purchase and use of counterfeited and falsified products.

As well known, the counterfeited goods result in significant losses of manufacturers' revenue and losses of government agencies due to short-received taxes. Illegally sold counterfeited products of the low quality are also detrimental to the consumer and the manufacturer. The harm to the consumers is associated with the low quality purchased goods. The harm to manufacturers is that they may lose their reputation, while facing an intensive competition. Further, their own final products might violate legal rights of others. Contraband goods, which are products made in order to bypass taxation or government regulations, also represent a significant problem for manufacturers and government agencies.

In general, use of the protection technology of the invention by manufacturers of the lengthy products, by encoding, applying codes and their recognition, ultimately reduces the risks of using low quality products, and as a consequence, prevents economic loses. A lengthy product is a product having the length to be substantially greater or the multiple of its other geometrical characteristics. Further, the invention allows the industry to increase revenues due to the possibility for consumers to choose products with existing codes and to avoid counterfeited products.

DESCRIPTION OF PRIOR ART

There is a need for manufacturers and consumers for protection against counterfeiting and forgery. This need is a basis for the development of methods and technology for providing and improving reliability.

There are known various methods for verifying the authenticity of consumer goods in both industrial and individual applications, using various identification means.

For example, there is known a method for determining the authenticity of goods using excise stamps (see https://www.nalogen.rU/m77/m/m pay taxes/excise/documental stamps/).

In this method Unified State Automated Information System (USAIS) for controlling alcoholic beverages is provided. In this method the manufacturer shall install a production line for surprinting excise stamps with an additional barcode and applying surprinted stamps to products. The line also includes computer equipment, software products, implies the use of communications for the Internet and maintenance by specially certified services. Excise stamps are made at the Goznak factory and distributed among manufacturers according to their needs after placing a special order. In the manufacture of excise stamps, up-to-date technologies that improve protection against counterfeiting are used (see http://www.goznak.ru).

However, the widely known method of verifying the authenticity of goods using the excise stamps of the USAIS has a number of disadvantages. The main one is that it is impossible for ordinary consumers to verify the authenticity of goods. At the same time, access to the USAIS implies special software that is inaccessible to most consumers and the end-to-end numbering of excise stamps facilitates the possibility of their forgery. Verification of the authenticity of goods using excise stamps is carried out using special scanning devices, which are also inaccessible to most consumers. Due to the elite nature, but not the close nature, of access to the USAIS, there is a threat of corrupt and unauthorized access to databases. This completely negates the effect of the reliability of product identification. All these disadvantages, in combination with the possibility of forgery of the very excise stamp, down to the material, of which it is made, show the low effectiveness of protecting goods using excise stamps. In connection with the above, the described method of verifying the authenticity of goods has been found useful for a limited type of goods, for example, alcohol and tobacco products.

There is also known a method for determining the authenticity of goods using holographic stickers thereon (see https://yandex.ru/patents/doc/RU2639015C1_20171219). Direct production of holograms consists of two main steps: production of an original hologram and mass duplication of the article in the form of holographic stickers, hot stamping foil, or transparent holographic laminates. The main protective properties of the hologram are placed at the stage/step of manufacturing its original. There are currently known three most common technologies for manufacturing the original: optical (laser) image recording, so-called Data matrix technology and electron beam (E-beam) technology based on the synthesis of microrelief with specified parameters using an electron beam. But the existing method of verifying the authenticity of goods using holographic stickers on them has a number of drawbacks. The main drawback is the cost-intensive execution of holograms at small draw, which is comparable to at least the cost of the goods of the small print runs. In addition, the described method requires special instruments to verify the authenticity of the holograms themselves.

There is also known a method for determining the authenticity of goods using unique labels (see Russian Application 2004117286, publ. Oct. 1, 2006, 7 IPC C09F 3/02). In the method for determining the authenticity of goods, a unique label is attached to the label/tag, the manufacturing of which ensures its uniqueness observed visually when comparing the tags. The resulting image is converted by a special program into a numeric code that is introduced into a special database. When checking the goods, the unique tag is scanned, its image is converted to a digital code, after which the numerical code is sent to the database to obtain information about the product being checked. But the described method for determining the authenticity of goods by means of unique labels, despite many advantages over the above-described analogues, has disadvantages. The main disadvantage is that the application of this method is associated with the need for the presence of means for digitizing images at points of sale of goods or individual portable communication devices equipped with photoelectric converters, such as digital photo cameras. The foregoing is difficult and expensive.

There is also known a method for determining the authenticity of goods using unique codes (Russian Application 2004124020, publ. 27 Jan. 2006, 7 MPK G06K 1/00; G09F 3/00). This method consists of assigning a unique code-identifier, registered by the manufacturer and hidden from reading by the protective layer, to each product. Each item is assigned with a unique code-identifier registered by the manufacturer, hidden from the free reading by the protective layer. Further, the unique code is checked by the available communication means by comparing the code assigned to the product with the copy of the code registered in the manufacture database.

In this method of determining the authenticity of the product, the protective layer is structurally connected to the package, so that it is necessarily destroyed upon opening the package or by any other action associated with the beginning of the product use article operation, and verifying the authenticity of the product a based on the rule according to which it is recognized as an authentic only if this verification is the first verification for the product. This method has certain disadvantages. In particular, according to the method, in the case of protection of the production of one manufacturer, there is a possibility of falsification of the control function. This occurs by applying the coordinates of specially created intruder to the package of counterfeit goods of a similar center of request reception. This is because the coordinates of the original request center are not stored by most customers due to the use of each producer its own coordinates. But the main drawback of this method is the need to destroy the integrity of the package to determine the authenticity of the goods.

Similar method is disclosed in Russian Application No. 2006142088/09, publ. Oct. 4, 2008, IPC G06Q 30/00 (2006.01). this method of determining the authenticity of goods allowed multiple verification of the authenticity of goods for the entire goods movement chain from the manufacturer to the consumer by simple, available means, which can significantly increase the reliability of such verification. The essence of this method is in application of N-digit number to the goods or the respective packaging, checking by telecommunication means such N-digit number and instructions for verifying the specified N-digit number; wherein N-digit numbers and the respective unique codes are generated by means of program once, at the time of system installation; N-digit number is assigned to goods in the center of assigning unique codes of goods; simultaneously recording information is carried out into a single database, wherein such information includes the respective N-digit number of the unique product code comprising: the country code, the manufacturer code, the product code, and additional information codes, including the advertising nature. The authenticity of the goods is checked by comparing the unique product code corresponding to the N-digit number reported by the consumer through the telecommunication means. When the reported the N-digit number corresponds to the N-digit number of the single database, the consumer receives information about the goods which is the basis for the authenticity of the goods report. In case of a mismatch, the consumer is informed that the product is considered to be counterfeited. The essence of this method is based on using the N-digit number consisting of 10-12 alphanumeric units. Further the method includes a storage facility which is a database of N-digit numbers and unique codes which are is stored simultaneously in the center of assigning codes and in a single database. The most significant drawbacks of this method are: 1) applying N-digit numbers to the outer shell of the goods, which can increase the probability of error in case of the damage to the outer shell of the goods; 2) functioning of the DB and PO within the given method, upon request of the consumer, which can lead to temporary losses; 3) the need for a subprogram, as well as the complexity of obtaining the requested information.

The improvement of the marking method is presented in the Application 2013135499/08, publ. Oct. 7, 2016, IPC G06K 5/00 (2006.01), G06Q 10/06 (2012.01), H04L 9/32

(2006.01), G06Q 30/00 (2012.01). The proposed method for marking manufactured products is a cryptographic key in an inactive state at a certain point in the delivery chain of manufactured products. The cryptographic key in an inactive state at a certain point in the supply chain of manufactured products items is provided to the verification center of the cryptographic key in an active state and an activation code for activating the cryptographic key in an inactive state to generate a cryptographic key in the active state. An activation code is provided at a certain point in the supply chain in response to transmitting information from that supply point relating to the received cryptographic key. An activation code allows the cryptographic key to be activated in an inactive state in the supply chain circuit to generate a cryptographic key in an active state, wherein the step of providing an activation code to a point in the supply chain comprises transmitting an activation code from the verification center to a point in the supply chain. Further, at the point in the supply chain, the identification (ID) code is generated for each manufactured product. The ID code is derived from the cryptographic key in the active state, and the dynamic key generated for each batch of manufactured products; the dynamic key is provided for each batch of manufactured products to the verification center; each manufactured product is marked using the ID code; and count the number of codes applied as the ID marker on the manufactured products is counted. The verification center encrypts the activation code using the public key from the asymmetric key pair associated with the cryptographic key certificate, so that the activation code can be decrypted by the point in the supply chain using a private key from a pair of asymmetric keys associated with the cryptographic key certificate. As indicated by the authors, the marking step for each manufactured product may comprise ink jet printing, topographical printing, laser printing, or any other printing or marking which allows printing or marking the code ID on each object. The marking step for each manufactured product may comprise printing or marking each product, printing or marking the outer packaging, printing or marking stickers or labels, or any other suitable printing or marking method. The point in the supply chain may comprise a sensor for detecting the marked ID codes on the manufactured products. The sensor may confirm that each ID code was appropriately applied as a marker to the manufactured product. The sensor may only count the number of ID codes correctly applied as a marker to the manufactured products. This marking method makes it possible to determine the number of items in a batch if the code is applied to each item of goods, but preference is given to coding the item of goods from the entire batch. The drawbacks of this method are similar to that of the previously discussed publications, i.e., outer shell applications, as well as time loss and complexity of the recognition process. Also, this method is focused on the fact that the Verification Center can be managed by a trusted party, independent of the manufacturers of manufactured items. For example, the verification center may be under the control of a government authority.

Application 2014115185/08, publ. Oct. 1, 2015, IPC G06K17/40 (2006.01), G06F 17/40 (2006.01) also discloses a system for controlling the movement and authenticity of products, which consists in developing a corresponding device for controlling the movement and authenticity of the product. The system comprises an individualization unit, the information output of which is connected to the first data input of the database, a second individualization unit, the information output of which is connected to the second data input of the database, an identification unit, one information input-output of which is connected to the data input/output of the database, and other information inputs/outputs of the identification unit are configured to be connected to the terminals of the end users, and a router, the inputs of which are configured to be connected to the user terminals, and the output-to the information input of the database.

The proposed technical solution can be implemented using a known, commonly used equipment, and provides its communication with terminals of users and end users on available remote access networks and therefore its use does not require significant material costs. This invention is aimed at increasing the efficiency of controlling the authenticity of the product during its movement in pharmacological production, wherein any violation of the sequence of movement of the batch of goods can indicate the appearance of the counterfeited goods in the bulk of the whole commodity batch or part thereof. This method is only directed to pharmacological products, and more to the protection of the interest of manufacturers.

Further, other methods for determining the authenticity of goods using unique codes are also known. Thus, marking and identification methods are known, for example, MIL-STD-1189, or European Arc Numbering Code, wherein information is contained in the location of the different width of the bar elements and gaps. information is contained in the arrangement of dashed elements and gaps of various widths.

By means of a simple printing method, the bar elements are applied in contrasting color with gaps on the carrier; bar elements are applied in a color that contrasts with the gaps on the carrier, typically paper or plastic plate, etc. There are reader devices that can read such barcodes. A method is known in which data objects are marked with data containing coded information or an electronic digital signature, by providing an object with a memory device or a data carrier with said data or applying said data to the object. The authenticity check is carried out using an identification device configured to convert the data into messages that are checked by cryptographic algorithms. For example, RF Patent No. 2281552, IPC G06K 5/00, published in 2003.

A similar method for marking and identifying an object is disclosed by Russian Patent No. 2291485, IPC G06K 7/00, wherein protective labels in the form of a diffraction relief bar code consisting of narrow rectangular fields and intermediate surfaces covered with microscopic fine optically active structures are applied through the template to the article to be protected or label. Specifically, it is the mutual arrangement of narrow rectangular fields and intermediate surfaces is the encoded information of the article to be protected. When reading this information, the protected article or label is illuminated by with incident light which diaphragms from narrow rectangular fields and polarizes from the intermediate surfaces, and this back-scattered radiation is read by the reader-scanner. In addition, a second layer applied under certain conditions is added to increase the degree of protection. But this method has a limited placement density of the security tags defined by the code structure itself, reading and decrypting the encoded information requires a large amount of random-access memory for its processing and subsequent transmission over the networks.

The method disclosed in Russian Application JOSF2017130790, publ. 28 Feb. 2019, IPC G06K 1/12 (2006.01), G09F 3/00 (2006.01) is considered by the inventors to be most pertinent to the present invention. According to this invention a bar code is applied to each product unit. This code does not contain product information and in which the access key is encoded in the information system on a particular product unit, the access key to information in the information system on a particular product unitinitially generated in the information system and entered into the database, at the marking step using a scanner and an application interacting with the information system to which authorized access is provided, scanning the bar code; and at the same time linking each specific product with a bar code printed on it to information about this product previously entered into the information system, simultaneously associating each specific product instance? with the bar code applied thereon to the information about that instance of the product previously entered into the information system which activates the bar code in the information system. During the verification process, the bar code is read from the inspected product unit by means of a code scanner with installed software for reading the bar code with simultaneous display on the information display device connected to the code scanner according to a unit of products corresponding to the barcoded key, corresponding to the code encoded in the bar code, characterized in that the elements the bar code elements (strokes and gaps) are further coated with a copy protection element-chemical composition rendered, depending on the manufacturing technology and the properties of the chemical composition, the naked eye or by means of the corresponding technical means, and the authorized and the above-mentioned organs, as well as consumers, the product is checked by scanning the bar code and visual control of the presence of the chemical composition in the bar code elements depending on the manufacturing technique and properties of the chemical composition, the naked eye or by the corresponding technical means, wherein the chemical composition for coating the bar code elements is such that it does not interfere with the machine reading of the barcode under different illumination conditions or at a low contrast of the bar code with respect to the surface of its application.

The drawbacks of the above discussed method are as follows: each product unit is encoded once, which makes reliability of the method to be insufficient for the production of the lengthy products. Further, no information about the product is represented by encoding. The coding is also external, which may cause errors in determining the authenticity of the product in case of damage to the outer shell. The use of the chemical compositions depending on the manufacturing technique and properties of the chemical composition makes this method expensive and environmentally hazardous.

The goals addressed by the technology for protection against the counterfeiting and forgery of products of the invention by encoding, applying codes and their recognition is resulted in such a method that allows multiple verification of the authenticity of the product to the consumer with simple, available means with low labor costs and high rate of obtaining information about the manufacturer.

Thus, review of the scientific and technical literature and patent documentation of other technical solutions with the proposed set of essential features have not been identified by the applicant. The proposed technology for protecting against counterfeiting and forgery by encoding, internal placement of unique codes and their recognition may be implemented on the basis of the use of known materials and functional elements and can be used for reliable monitoring and detection of contract and falsification. Based on this, the Applicant considers that the offer according to this application corresponds to the criteria for the new application and the industrial applicability.

The essence of the invention is explained by a non-exclusive example of performing a functional scheme of the proposed protection technology from the fact and falsification by encoding, internal placement of unique codes and their recognition. While the main technical features and advantages of the present technology are described in detail by the above embodiment with respect to the production of long/lengthy products, it is clear that the scope of protection is not limited to the example described and includes a variety of alternative embodiments according to the general concept of the present technology.

SUMMARY OF THE INVENTION

The essence of the invention relates to the technology of recognizing identification codes located inside of the lengthy product by telecommunication means equipped with a unique identification program. The identification code contains information about the manufacturer, as well as the physical characteristics of the products reflected in the quality certificate.

The identification codes are printed on a special tape made of Dacron or similar materials by a chemical ink, with the codes being spaced by equal distances. The tape during the manufacturing process is placed directly or spirally along the entire length of the lengthy product, thereby providing a high level of internal protection against the counterfeiting and falsification.

The encoded information is read by telecommunication means utilizing a special program from the tape placed inside the lengthy product, also developed by the inventors. It should be noted that access to the program is open through Google Play Mark and Apple Store. The access to the program is open for any user interested in obtaining the information about the authenticity of the lengthy product, about its length, about its technical characteristics reflected in the quality certificate for the product, as well as additional information placed by the manufacturer at its discretion.

The following represents essential features of the invention: the proposed technology is quite reliable, since it is associated with the simultaneous use of multiple protection methods: the internal protection through use of a tape with unique codes, which is embedded under a sheath in a cable structure of the product;
  using unique identification codes that contain the country code, producer code, batch code, production date code, additional codes reflecting the physical characteristics of the lengthy product; using available telecommunication means (mobile phones, tablets) equipped with a special mobile code recognition application acquired by the consumer through Google Play Mark and Apple Store;
  forming a single database of producers of the lengthy products based on providing them with the corresponding information to be subsequently encoded;
  simplifying of obtaining information about the authenticity of the product based on the scanning of the two codes on the tape inside the lengthy product by means of telecommunication means equipped with a special mobile application of code recognition.

The invention provides possibility of obtaining an important additional information for the consumer: essentially about the length of the lengthy product, the physical characteristics of the lengthy product in accordance with the certificate quality on the product, as well as the essential from the point of view of the manufacturer information; and also provides feedback communication between the user and the manufacturer.

Based on the above, it is considered that the overall technical effect of the present invention is to provide a technique for providing multi-level protection from counterfeiting and falsification perspective of products by encoding, internal placement of the tape with identification codes and their recognition by means of a special program in telecommunication means by any interested person. Specifically, the presented technology provides a high degree of reliability, availability and information content.

The system consists of three essential components/participants: IT company; producers of the lengthy products and consumers-interested parties in the authenticity of the products. Within this system, a consumer is considered to be any person desiring to obtain information about the authenticity of the product to be purchased. Based on the invention unlimited number of consumers by means of telecommunication means equipped with a special mobile application of codes recognition, based on the scanning of codes receive information about the authenticity of the product, receive contact information about the manufacturer, and information on the product certificate, and information about the length of the specific unit of products.

IT-Company (Integrity-applicant) generates identification codes using a pseudo-random number generator, creates a database, updates it, develops and places a unique identification code recognition program in Google Play Market and Apple Store, and provides answers to consumer requests using the system.

Also, the system consists of an arbitrary number of producers that may be geographically located anywhere. They acquire a protective tape with applied identification codes, place the tape under the sheath into the cable structure, provide the information about the beginning and the end of the section to the IT company (Integrity), as well as carry out the technical control and provide the product quality certificate, which is also reflected in the database. Optionally, the manufacturer may place additional information about itself.

In general, the use of the present invention in the economy will make it possible to significantly increase the level of protection of consumers and benign producers against counterfeit and falsification on the basis of providing a higher degree of reliability, availability and information content.

DETAILED DESCRIPTION OF THE INVENTION

Figure 1:
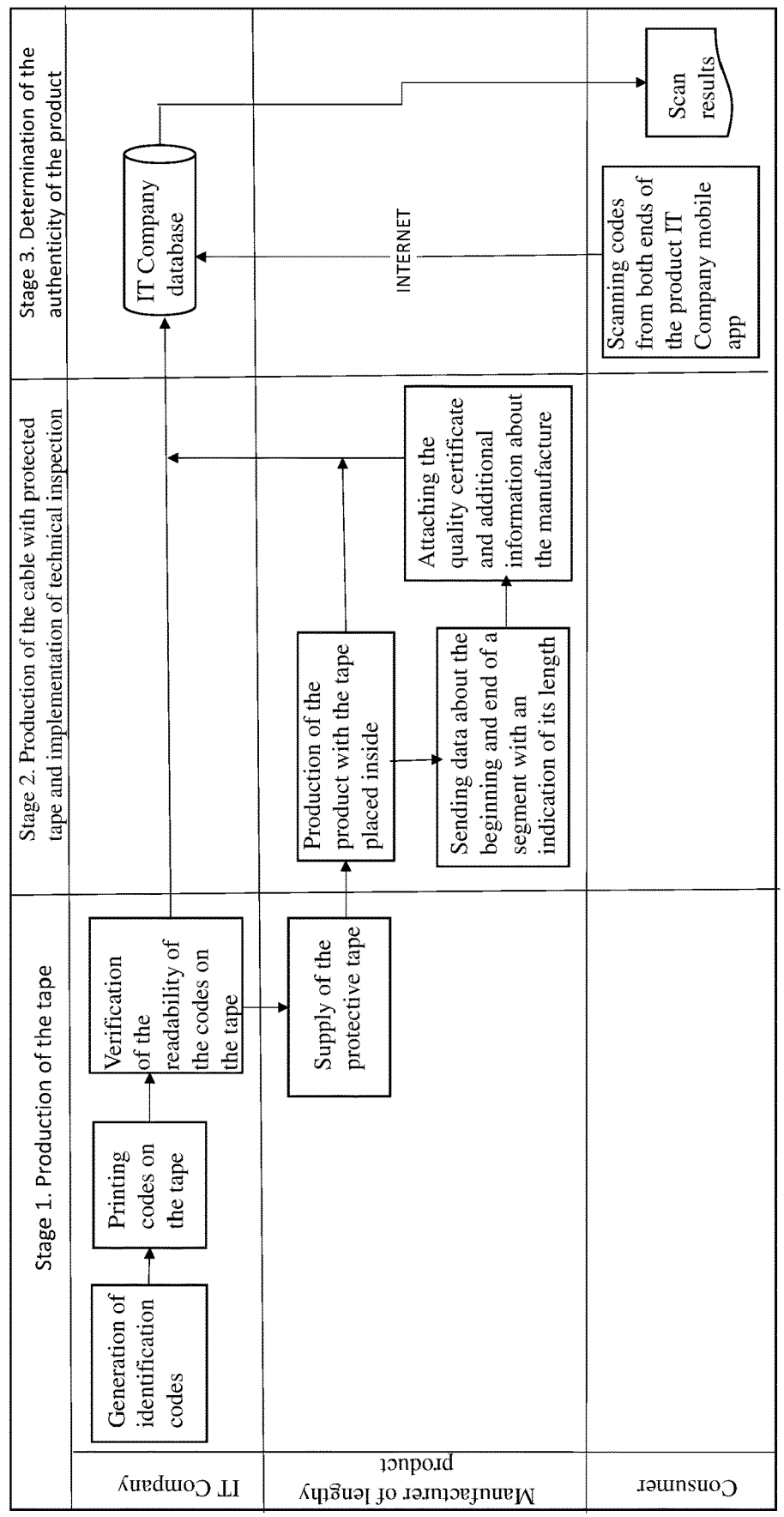
FIG. 1 is a schematic diagram showing illustrating a method of implementation of the disclosed technology for protection of lengthy products against counterfeiting and forgery (FIG. 1).
Figure 2A:
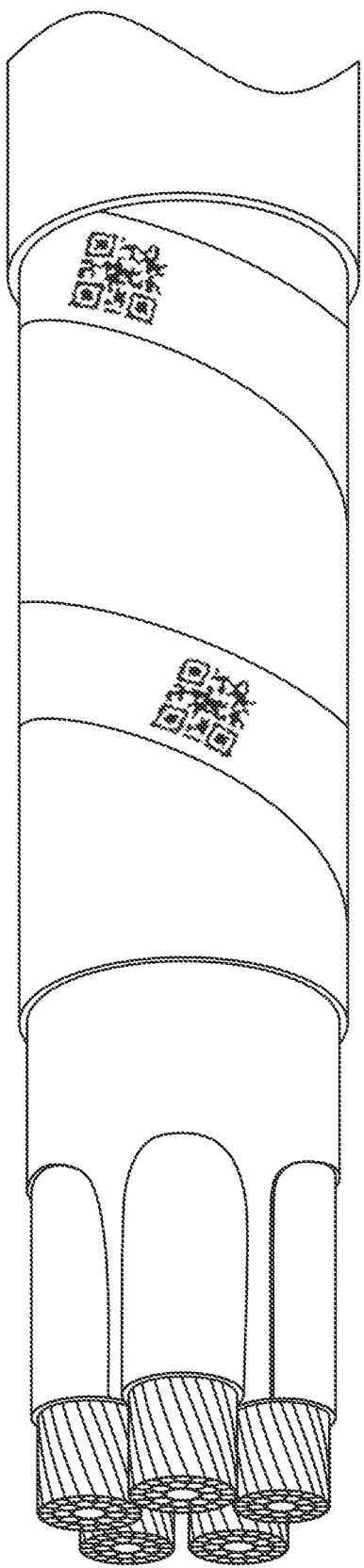
FIGS. 2A and 2B illustrate an example of utilizing the technology of the invention in manufacturing of a cable-conductor product, wherein the tape with the codes is placed linearly and spirally along the length of the product.
Figure 2B:
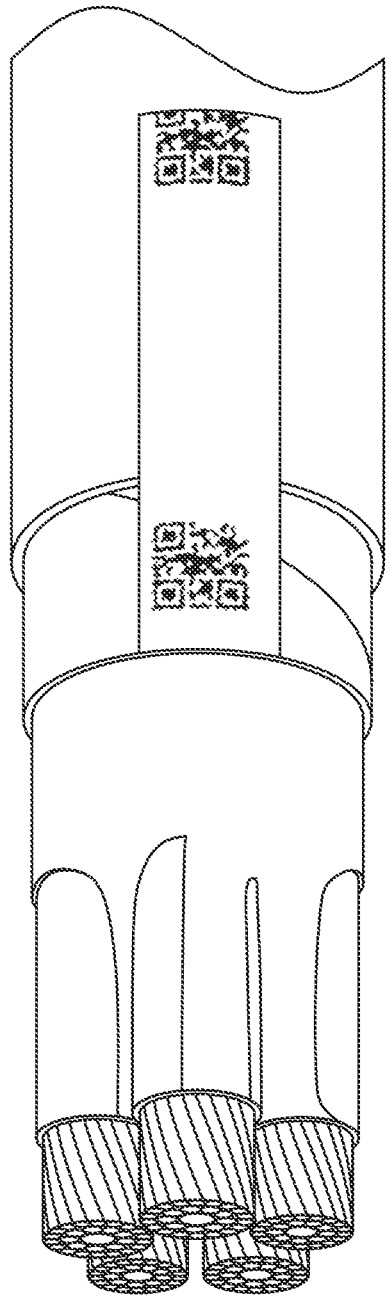

The essence of the invention relates to the technology of identifying identification codes located inside the lengthy products by recognizing telecommunication systems equipped with a unique identification program. The disclosure of each of the above-mentioned the three steps illustrated in FIG. 1 is provided below.

I Step. Tape Production.

IT Company (Integrity) generates identification codes by a pseudo-random number generator. The IT Company orders manufacture of the protective tape with the identification codes applied thereto and verifies the level of quality and time of readability of the applied identification codes over the entire length at regular intervals. The company finalizes contracts for the supply of the protective tape.

II Step. Manufacturing of a Cable Having a Protective Tape and Performing a Technological Process Control.

The manufacturers acquire the protective tape with identification codes and ensure placement of the tape under the sheath within the cable structure along the entire length of straight or spiral portions of the products. After that, the manufactures of the lengthy product transmit data about the beginning and the end of the specific portion to IT-Company. The quality control staff of the manufacturer performs technical control functions and generates quality certificate which contains all physical characteristics of the manufactured batch of the products. This information is also transmitted in IT-Company, which supplements the database and places the quality certificate in the system. The manufacturer's managers can also generate additional information about the manufacturer (instructions, photo, video, etc.) and transmit it to the IT company to be placed in the system, so as to be reflected when scanning the identification code by consumers is performed. Based on the data provided, it is possible to update information constantly in the database of the IT company (Integrity).

Step III. Recognition of the Identification Code and Determination of the Authenticity of the Product The IT company (Integrity) develops and places in Google Play Market Apple Store, etc. a unique program for recognizing identification codes for the products, which are purchased by persons interested in verifying the authenticity of the longitudinally extending products. By means the program scanning of codes is carried out and the request to the IT company (Integrity) is generated. The company determines the authenticity of products based on the comparison of the product code and the codes in the database. Scanning the "beginning" and "end" codes of the segment allows to obtain the information about the length of the lengthy products, about the physical characteristics of the products reflected in the quality certificate as well as to access the additional information provided by the manufacturer.

Based on use of the results of the presented technology, consumers with the help of simple manipulations instantly receive the necessary up-to-date information about the lengthy products and their manufacturers, so as to protect themselves from the use of counterfeited products.

Manufacturers of the lengthy products, by using the technology of the invention, realize multilevel protection for their products in the markets, thereby increasing their competitiveness.

The invention claimed is:

1. A method for providing multi-level protection against counterfeiting and forgery of lengthy products, the method comprising of the following steps:
    generating identification codes containing following information: a country code, a producer code, a batch code, a production date code and codes reflecting physical characteristics of the lengthy products;
    transferring the generated identification codes to a database;

printing the identification codes on a tape, with said codes being equally spaced from each other forming multiple tape segments;

placing said tape having the printed identification codes inside the lengthy product along its entire length;

transferring the following information to the data base: information related to a beginning and an end of each said tape segment placed inside the products and information about a quality certificate of a relevant product and forming codes related thereto;

scanning the beginning code and the end code for each said tape segment placed inside the lengthy product;

transmitting a request by a consumer comprising the scanned codes to the data base;

verifying presence of the received codes within the database; and transmitting a response to a telecommunication device of the consumer comprising verification of an authenticity of the lengthy product if the corresponding codes are present in the database.

2. The method of claim 1, wherein in said step of generating identification codes the identification codes are generated by means of a pseudo-random number generator.

3. The method of claim 1, wherein in said step of printing the tape is made of Dacron.

4. The method of claim 1, wherein in said step of printing said codes are printed by a chemical ink.

5. A method for providing multi-level protection against counterfeiting and forgery of lengthy products, said method comprising of the following steps:

generating identification codes containing following information: a country code, a producer code, a batch code, a production date code and codes reflecting physical characteristics of the lengthy product, said codes are generated using a pseudorandom number generator;

transferring the generated identification codes to a database;

printing said identification codes on a tape using chemical ink, with the tape being made of Dacron;

placing said tape having the printed identification codes inside the lengthy product along its entire length;

transferring the following information to the data base: information related to a beginning and an end of each said tape segment placed inside the products and information about a quality certificate of a relevant product and forming codes related thereto;

scanning the beginning code and the end code for each said tape segment placed inside the lengthy product;

transmitting a request by a consumer comprising the scanned codes to the data base;

transmitting a response to a telecommunication device of the consumer comprising verification of an authenticity of the lengthy product when the corresponding codes are present in the database; and verifying presence of the received codes in the database, and when the relevant codes are available at the database, a response containing confirmation of the authenticity of the longitudinally extended products is transmitted to a consumer telecommunication device.

* * * * *